Patented Mar. 25, 1941

2,236,184

UNITED STATES PATENT OFFICE 2,236,184

PREPARATION OF POTENTIALLY REACTIVE SOLUTIONS OF UREA-FORMALDEHYDE REACTION PRODUCTS

Adolf Menger, Krefeld-Uerdingen, Germany, assignor, by mesne assignments, to Plaskon Company, Incorporated, Toledo, Ohio, a corporation of Delaware No Drawing. Application July 7, 1938, Serial No. 217,966. In Germany October 9, 1934

4 Claims. (Cl. 260—29)

The invention relates to potentially reactive solutions, particularly those containing a formaldehyde-urea compound. Potentially reactive solutions made from thermosetting synthetic resins are valuable as impregnating liquids, adhesives, lacquers and the like. Such solutions can be used to furnish water-resistant products, because the thermosetting resins therein can be rendered insoluble. Products made with solutions of most thermosetting resins, however, have to be pressed at an elevated temperature in order to harden the resin properly.

Most laminated products, such as plywood, are produced in unheated presses because of the relative expensiveness of heated presses. The adhesives ordinarily applied between layers of plywood are glues which contain no thermosetting resins and do not form water-resistant bonds. Formaldehyde-urea resins, however, have possibilities for use in the manufacture of laminated products by cold-pressing, because formaldehyde-urea resins become insoluble after their solutions have been acidified.

Yet a formaldehyde-urea solution that has been so acidified that it may be used to manufacture water-resistant products has heretofore been extremely difficult to use commercially, because the formaldehyde-urea compound in such a solution tends to become insoluble before the operator has had time to apply the solution to the plies that are to be secured together. If the operator reduced the acidity of his solution so that the reaction proceeded slowly enough to give him time to apply the solution properly, then the solution did not give water-resistant products.

The principal object of the invention is the preparation of a potentially reactive solution of a thermosetting synthetic resin that gives a water-resistant product when used as a bonding agent but remains stable long enough to give ample time for applying the solution. More specific objects and advantages are apparent from the description, which merely discloses and illustrates the invention and is not intended to impose limitations upon the claims.

A potentially reactive solution embodying the invention may be prepared from a formaldehyde-urea reaction product, a stable ammonium salt of a strong acid, such as ammonium chloride, ammonium sulphate or ammonium bromide, and an agent capable of substantially retarding the hardening of said product by fixing free formaldehyde in the solution. The preferred retarding agent is ammonia, which need not be in the free state, but may be in the form of ammonium hydroxide or any other ammonia compound in which the ammonia is capable of substantially retarding the hardening of the formaldehyde-urea compound by fixing free formaldehyde in the solution. Urea also acts as a retarding agent, and the preferred solution embodying the invention contains both ammonia and urea.

When a solution is prepared from a formaldehyde-urea compound and an ammonium salt of a strong acid without a retarding agent, the solution is initially acid and its acidity rapidly increases as the ammonia from the ammonium salt combines with the free formaldehyde in the solution to form hexamethylene tetramine. If some aqueous ammonia is added to the solution along with the ammonium salt of the strong acid, the ammonia tends to neutralize the solution at the outset, but the acidity of the solution increases so rapidly that after a few seconds its acidity is the same as it initially would have been if the aqueous ammonia had been omitted. Thus the incorporation of aqueous ammonia in the solution might be expected to retard the hardening of the formaldehyde-urea compound only a few seconds and thus give the operator only a few seconds of additional time in which to apply the solution to plies that are to form a laminated article. However, it has been discovered that the solution to which ammonium hydroxide has been added, which takes only a few seconds to become just as acid as it would have been initially if the ammonium hydroxide had been omitted, nevertheless takes several times as long to become sufficiently acid to cause the formaldehyde-urea compound to gel.

There is nothing in the solution that might react with the ammonia except the free formaldehyde. Thus it is believed that the ammonium hydroxide that is added to the solution reacts rapidly with the free formaldehyde, and within a few seconds is all converted into hexamethylene tetramine.

The resulting solution, which takes several times as long to harden as a solution to which no ammonium hydroxide has been added, differs from the latter solution in that the ammonium hydroxide has fixed a substantial proportion of the free formaldehyde normally present in the solution. The reduction in the free formaldehyde content of the solution then causes the conversion of the ammonia from the ammonium salt of the strong acid to hexamethylene tetramine and the resultant liberation of the strong acid to proceed much more slowly.

Thus a solution embodying the invention is a solution of an ammonium salt of a strong acid and a formaldehyde-urea reaction product in which a substantial proportion of the free formaldehyde normally present in the solution has been fixed by additional ammonia. The fixing of free formaldehyde in the solution in accordance with the invention may be regarded as merely temporary, because the solution by the time it becomes stiff, may contain substantially as much free formaldehyde as if no retarding agent, such as ammonium hydroxide or urea had been added. A sufficient quantity of an ammonium salt of a strong acid should be incorporated in the solution so that within a reasonable time the solution will become acid enough (pH about 3) to harden the formaldehyde-urea compound. Although the retarding agent has no further effect after combining with the free formaldehyde it retards the releasing of the strong acid from the ammonium salt to such an extent that it permits a substantially greater quantity of the ammonium salt of the strong acid to be used in the solution.

Since solutions embodying the present invention that are sufficiently stable for practical use may contain a greater quantity of an ammonium salt of a strong acid than prior solutions, the present solutions eventually become much more acid than prior solutions and therefore give superior products.

Moreover, the hardening of objects made from the present solutions is much more rapid after the effect of the retarding agent has worn off than the hardening of objects made from prior solutions. Thus while the present solutions remain stable longer than prior solutions, to give the operator ample time to apply them, articles made with the present solutions attain their final water-resistant state in only a fraction of the time required by prior articles because of the greater amount of an ammonium salt of a strong acid that can be used in the present solutions. For example, a solution can be prepared from a formaldehyde-urea compound, ammonium chloride and a retarding agent which takes five times as long to become stiff as a similar solution containing no retarding agent and half as much ammonium chloride. Yet after the former solution has been applied in the form of an adhesive the resulting bond takes only 24 hours to attain its maximum strength, whereas a bond from the latter solution takes a week.

The invention is applicable to solutions for use in the manufacture of articles by hot-pressing, as well as cold-pressing, and the proportions of the ingredients may be adjusted to suit any operating conditions. In general, more of the ammonium salt of a strong acid is required for cold-pressing than for hot-pressing. Articles that have been cold-pressed may be stored at an elevated temperature to hasten the hardening of the resin after they have been removed from the press. Cold-pressing followed by storage of the pressed articles at an elevated temperature is a less expensive process than hot-pressing because of the lower cost of the equipment required.

The invention may be applied to any solution of a formaldehyde-urea reaction product and a solution embodying the invention may be used as a binder in the production of impregnated products, as an adhesive for applications, such as the manufacture of ply-wood, as a dressing or creaseproofing agent for textiles, or as an ingredient for coating compositions. In the preparation of a suitable formaldehyde-urea solution it is usually desirable to carry the formaldehyde-urea reaction as far as possible without rendering the formaldehyde-urea compound insoluble.

A solution embodying the invention may be prepared as follows:

180 pounds of urea are dissolved in 132 pounds of water at 80° C.; 607 pounds of a 30% solution of formaldehyde at 95° C. are then brought to pH 4.5–5.0 by means of sodium hydroxide and the urea solution is gradually added to the formaldehyde solution. As soon as the formaldehyde-urea reaction has progressed to the desired stage (about 30 minutes after all the urea has been added), the solution is neutralized and evaporated under a vacuum to the desired viscosity.

A second solution is prepared from 19 parts of water, 27 parts of a 27% aqueous ammonia solution, 8 parts of ammonium chloride and 45 parts of urea. This second solution has a pH of about 8. Immediately before the formaldehyde-urea solution is to be used, it is mixed with the desired proportion of the second solution. A filler or extender, such as rye flour, may be added if desired. After the two solutions have been mixed, the free formaldehyde gradually combines with the ammonia until all the available ammonia has been used up, the ammonium chloride being converted into hydrochloric acid.

Various solutions embodying the invention may be prepared to meet various requirements.

This application is a continuation in part of my application Ser. No. 42,146, filed September 25, 1935.

I claim:

1. A method of making a potentially reactive aqueous solution that comprises preparing a solution from a water-soluble formaldehyde-urea reaction product, urea, ammonium chloride, and ammonia which is in addition to the ammonia in the ammonium chloride and which alone is sufficient in amount to fix enough formaldehyde to render the concentration of free formaldehyde in said solution substantially less than the concentration normally present in an aqueous solution of said reaction product, whereby the hardening of said product is retarded.

2. A method of making a potentially reactive aqueous solution that comprises preparing a solution from a water-soluble formaldehyde-urea reaction product, an ammonium salt of a strong acid, and ammonia which is in addition to the ammonia in said salt and which alone is sufficient in amount to fix enough formaldehyde to render the concentration of free formaldehyde in said solution substantially less than the concentration normally present in an aqueous solution of said reaction product, whereby the hardening of said product is retarded.

3. A potentially reactive aqueous solution prepared in accordance with the method of claim 1.

4. A potentially reactive aqueous solution prepared in accordance with the method of claim 2.

ADOLF MENGER.